United States Patent
Chen et al.

(10) Patent No.: US 11,988,792 B2
(45) Date of Patent: May 21, 2024

(54) MULTIMODAL IMAGING SENSOR CALIBRATION METHOD FOR ACCURATE IMAGE FUSION

(71) Applicant: Logistics and Supply Chain MultiTech R&D Centre Limited, Pok Fu Lam (HK)

(72) Inventors: Hung Kwan Chen, Pok Fu Lam (HK); Chi Hung Tong, Pok Fu Lam (HK)

(73) Assignee: Logistics and Supply Chain Multi Tech R&D Centre Limited, Pok Fu Lam (HK)

( * ) Notice: Subject to any disclaimer, the term of this patent is extended or adjusted under 35 U.S.C. 154(b) by 733 days.

(21) Appl. No.: 17/255,136

(22) PCT Filed: Jun. 29, 2018

(86) PCT No.: PCT/CN2018/093675
§ 371 (c)(1),
(2) Date: Dec. 22, 2020

(87) PCT Pub. No.: WO2020/000367
PCT Pub. Date: Jan. 2, 2020

(65) Prior Publication Data
US 2021/0271922 A1    Sep. 2, 2021

(51) Int. Cl.
| | |
|---|---|
| *G01V 11/00* | (2006.01) |
| *G01S 13/88* | (2006.01) |
| *G06F 18/25* | (2023.01) |
| *G06V 20/52* | (2022.01) |

(52) U.S. Cl.
CPC ............ *G01V 11/00* (2013.01); *G01S 13/886* (2013.01); *G01S 13/887* (2013.01); *G06F 18/253* (2023.01); *G06V 20/53* (2022.01)

(58) Field of Classification Search
CPC ..... G01V 11/00; G01S 13/886; G01S 13/887; G06F 18/253; G06V 20/53
See application file for complete search history.

(56) References Cited

U.S. PATENT DOCUMENTS

| | | | | |
|---|---|---|---|---|
| 2012/0326959 | A1* | 12/2012 | Murthi | ...... G06F 3/011 |
| | | | | 382/173 |
| 2014/0341431 | A1* | 11/2014 | Chen | ........ G06F 18/22 |
| | | | | 382/103 |
| 2016/0025948 | A1* | 1/2016 | Lakshmikumar | ...... G02B 5/045 |
| | | | | 250/206 |
| 2018/0232581 | A1* | 8/2018 | Reinpoldt | ............ G06V 30/142 |

FOREIGN PATENT DOCUMENTS

| | | |
|---|---|---|
| CN | 102055954 | 5/2011 |
| CN | 202372651 | 8/2012 |
| CN | 107238868 | 10/2017 |

* cited by examiner

*Primary Examiner* — Christopher M Brandt
(74) *Attorney, Agent, or Firm* — Renner, Kenner, Greive, Bobak, Taylor & Weber

(57) ABSTRACT

A system and a method for a crowd surveillance device comprising a multi-sensor system connected to a processing device, wherein the processing device comprises an image fusion module for receiving images from the multi-sensor system, transforming and fusing images into a fused image; an image analytic module for extracting each individual target and identifying any conceal object on the individual target, an alert triggering module for triggering an alert in the event a conceal object on the individual target is identified.

29 Claims, 3 Drawing Sheets

MULTIMODAL IMAGING SENSOR CALIBRATION METHOD FOR ACCURATE IMAGE FUSION

TECHNICAL FIELD

The present invention relates generally to an apparatus, system, or method for multimodal sensor image data processing methods and systems. Particularly, although not exclusively, the present invention relates to a multi-sensor theft/threat detection system for crowd pre-screening using images fusion techniques.

BACKGROUND

Image fusion (IF) is a technique to integrate complementary multimodal, multitemporal, and/or multiview information into one new image. That new image will contain information the quality of which cannot be achieved otherwise.

There are plenty of application in IF technology. In astronomy, multiple sensors fusion is used to achieve high spatial and spectral resolutions by combining images from two or more sensors: high spatial resolution sensor, IR sensor, and X-Ray senor. Medical imaging uses IF on simultaneous evaluation of CT, MRI, and/or PET images. Military, security, and surveillance applications use multi modal image fusion of visible and infrared images. With these technologies, security systems for use in theft or threat detection may be implemented.

SUMMARY OF THE INVENTION

The present invention provides an apparatus, system, or method for multimodal sensor image data processing methods and systems, the system and method may be used in multi-sensor theft/threat detection system for crowd pre-screening using images fusion techniques. Advantageously, the present invention may provide a new and novel computer vision surveillance method.

In accordance with a first aspect of the present invention, there is provided a crowd surveillance device comprising: a multi-sensor system connected to a processing device, wherein the processing device comprises: an image fusion module for receiving and fusing transformed images from the multi-sensor system to a fused image; an image analytic module for extracting each individual target and identifying any conceal object on the individual target, and an alert triggering module for triggering an alert in the event a concealed object on the individual target is identified.

In an embodiment of the first aspect, the multi-sensor system comprises a passive millimetre wave sensor.

In an embodiment of the first aspect, the multi-sensor system further comprises a RGB imaging device, a depth sensor, and a thermal sensor.

In an embodiment of the first aspect, the multi-sensor system is connected to the processing device through a wired connection.

In an embodiment of the first aspect, the multi-sensor system is connected to the processing device through a wireless connection.

In an embodiment of the first aspect, the image analytic module is adapted to analyse a series of time lapse fused images generated by the image fusion module for tracing the individual target and identifying any concealed object on the individual target.

In an embodiment of the first aspect, the alert triggering module is adapted to storing the alert, the images and related information to a database server connected to the processing device.

In an embodiment of the first aspect, the processing device is adapted to connect to an alert visualization device displaying an alert, images and the information.

In an embodiment of the first aspect, the image fusion module comprises a hardware or software module adapted to transform images received and find a mutual alignment by solving the correspondence problem in computer vision.

In an embodiment of the first aspect, the image analytic module is adapted to process the fused image by carrying out the step of:
extracting each individual from multiple targets on the fused image,
finding any suspicious contraband from the passive millimeter wave sensor and thermal sensor and correlate it to the extracted individual and
differentiating a truly concealed object by comparing images generated from the passive millimeter wave sensor and thermal sensor.

In an embodiment of the first aspect, the alert triggering module is adapted to analyse the suspicious target and concealed object identified from image analytic module across multiple frames.

In an embodiment of the first aspect, the alert triggering module is adapted to confirm suspicious contraband of an individual and generate alert through accumulating the positive detection result from image analytic module across multiple time lapse frames.

In an embodiment of the first aspect, the processing device is associated with a database server for storing and retrieving image data.

In an embodiment of the first aspect, the database server is connected to an alert visualisation device.

In an embodiment of the first aspect, the database server is adapted to collect and store information of suspects once there is an alert asserted by the processing device.

In an embodiment of the first aspect, the visualization device is adapted to receive or retrieve an alert and its corresponding information from the database.

In an embodiment of the first aspect, the visualization device comprises a display for displaying the information.

In accordance with a second aspect of the present invention, there is provided a method of using multi-sensor theft/threat detection for crowd pre-screening, the method comprising the steps of:
transforming images obtained from the multi-sensor system;
fusing transformed images;
extracting each individual target with a depth sensor and a thermal sensor and tracing the target across multiple frames;
analysing a passive millimeter wave image of each extracted individual target on the image across multiple frame and identifying any conceal object on the individual target.

In an embodiment of the second aspect, the method further comprises the step of triggering an alert and storing the images and related information to the database.

In an embodiment of the second aspect, the method further comprises the step of displaying an alert, images and the information on a display device.

In an embodiment of the second aspect, the multi-sensor system comprises a passive millimetre wave sensor.

In an embodiment of the second aspect, the multi-sensor system further comprises a RGB imaging device, a depth sensor, and a thermal sensor.

In an embodiment of the second aspect, the multi-sensor system is connected to the processing device through a wired connection.

In an embodiment of the second aspect, the multi-sensor system is connected to the processing device through a wireless connection.

In an embodiment of the second aspect, the method further comprises the step of analysing a series of time lapse fused images generated by the image fusion module for tracing the individual target and identifying any concealed object on the individual target.

In an embodiment of the second aspect, the method further comprises the step of storing the alert, the images and related information to a database server.

In an embodiment of the second aspect, the method further comprises the step of connecting to an alert visualization device for displaying an alert, images and the information.

In an embodiment of the second aspect, the transforming image step comprises the step of transforming images received from the multi-sensor system and finding a mutual alignment by solving the correspondence problem in computer vision.

In an embodiment of the second aspect, the analysing step further comprises the step of:
extracting each individual from multiple targets on the fused image,
finding any suspicious contraband from the passive millimeter wave sensor and thermal sensor and correlate it to the extracted individual and
differentiating a truly concealed object by comparing images generated from the passive millimeter wave sensor and thermal sensor.

In an embodiment of the second aspect, the method further comprises the step of analysing the suspicious target and concealed object identified from image analytic module across multiple frames.

In an embodiment of the second aspect, the method further comprises the step of confirm suspicious contraband of an individual and generate alert through accumulating the positive detection result from image analytic module across multiple time lapse frames.

In an embodiment of the second aspect, the database server is adapted to storing and retrieving image data, and associate with a processing device connected to the multi-sensor system.

In an embodiment of the second aspect, the database server is connected to an alert visualisation device.

In an embodiment of the second aspect, the database server is adapted to collect and store information of suspects once there is an alert asserted by the processing device.

In an embodiment of the second aspect, the visualization device is adapted to receive or retrieve an alert and its corresponding information from the database.

In an embodiment of the second aspect, the visualization device comprises a display for displaying the information.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
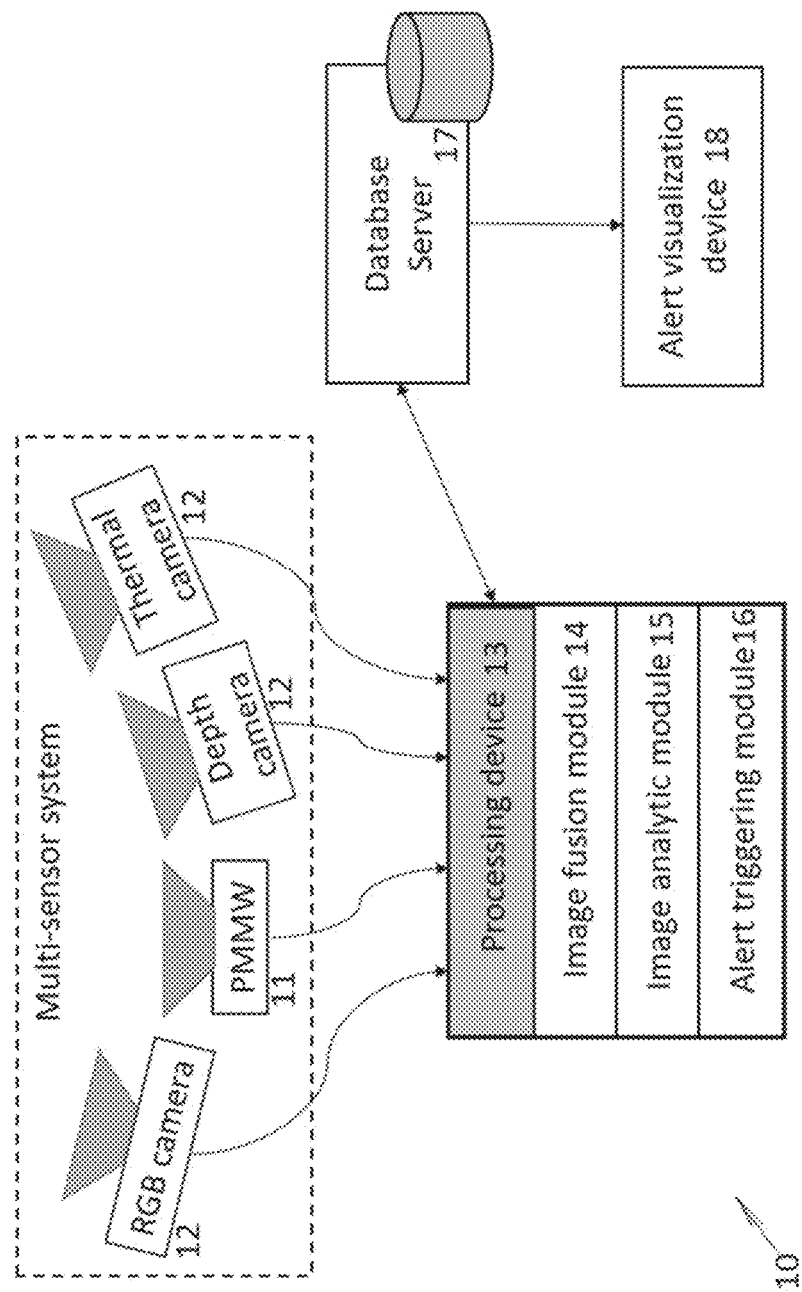
FIG. 1 shows a schematic diagram of a crowd surveillance device according to an embodiment of the present invention.

The inventors have, through their own research, trials and experiments, devised that, millimeter wave is within the frequency band that can penetrate most clothes materials which makes it a widely used imaging device for security application. These imaging devices can be categorised into either active devices or passive devices.

An active device emits millimetre wave and analyses the reflected wave to for scanning. This enables the formation of a clearer image but it invades privacy of the scanning target. On the other hand, passive device solely receives millimetre wave radiated from human body to create an image but, due to the low energy received by the device, it always results in a blurry image.

The passive device may suffer several limitations. It will require a target stands still in front of the device in order to obtain a clear image due to the low energy received by the device. Further, it can only scan a single target at a time.

Without wishing to be bound by theory, these limitations may hinder the use of passive millimetre wave under heavy passenger traffic environment. Therefore, it is always a challenge to keep a balance between efficient flow of passenger traffic and security management. Hence, there is no existing system proposed to use passive millimeter wave for crowd pre-screening purpose.

Multiview fusion techniques refer to a set of images of the same scene taken by the same sensor but from different viewpoints which are fused to obtain an image with higher resolution or cover broader area than the sensor normally provides or to recover the 3D representation of the scene. A typical application of this technique has been used for making 3D movies.

The multitemporal IF technique recognizes two different aims. Images of the same scene are acquired at different times either to find and evaluate changes in the scene or to obtain a less degraded image of the scene. The former aim is common in medical imaging, especially in change detection of organs and tumors, and in remote sensing for monitoring land or forest exploitation. The acquisition period is usually months or years. The latter aim requires the different measurements to be much closer to each other, typically in the scale of seconds, and possibly under different conditions.

Multimodal cameras leverage various cameras' sensing capabilities and integrate their information so as to provide a more comprehensive understanding of the real-world environment. Image fusion is a typical solution to integrate the information from different cameras. This requires one to solve the correspondence problem in computer vision—finding a set of points in one image which can be identified as the same points in another image Multimodal or multiple sensor image fusion is a process of combining relevant information from several images into one image. The final output image can provide more information than any of the single images as well as reducing the signal-to-noise ratio. The user can collect useful information without gazing at and comparing images from multiple sensors.

One import image fusion technique is the pixel-level method, which works either in the spatial domain or in the transform domain. The averaging method, maximising method, the Brovey method, principle component analysis (PCA), wavelet transformation, and intensity-hue-saturation (HIS) based methods fall under the pixel-level fusion method.

The prerequisite for carrying out pixel-level fusion is that the images have been acquired by homogeneous sensors, where the sensors are in stereo setting, same modality, same or similar field-of-views (FOVs) and resolutions.

In one example, a device for detection of contraband comprises at least one two-dimensional array of spatially distributed point sources of millimetre wave radiation arranged to illuminate a field of view. The point sources comprise oscillators that are not constrained to oscillate at the same frequency, means for focusing millimetre wave radiation from the field of view onto a focal plane, and a two-dimensional array of detectors disposed in said focal plane, each of said detectors generating an output signal responsive to millimetre-wave radiation from a particular portion of the field of view. The output signals may be provided to means for displaying an image of the field of view, the pixels of the displayed image corresponding to the output signals generated by the elements of the array.

This detection device is an example of an active millimetre wave device. However, as this system depends on millimetre wave source to focus on the target, it is not suitable for use in a crowded environment.

In an alternative example, there is provided a contraband detection system comprising a first camera having a first field of view, a second camera having a second field of view, and a display station coupled to the first camera and the second camera. The first camera has an output providing first image data representative of radiation in a first frequency band from items in the first field of view. The second field of view is at least partially overlapping the first field of view. The second camera has an output providing second image data representative of radiation in a second frequency band, different from the first frequency band, representative of items in the second field of view. The display station is adapted to receive the first image data and the second image data. The display station comprises at least one computer programmed to present a display of items in the first field of view using the first image data selectively overlaid with an indication of at least one item derived from the second image data. However, this device is not suitable for use in a crowded environment.

In yet another example embodiment, there is provided an apparatus for detection of contraband. The apparatus comprises at least one array of spatially distributed point sources of millimetre wave radiation. The distributed point sources are arranged to illuminate a field of view. The apparatus also has a means for focusing millimetre wave radiation from the field of view onto a focal plane, and an array of detectors disposed in the focal plane. Each of the detectors is adapted to generate an output signal responsive to millimetre-wave radiation from a particular portion of the field of view. The output signals may be provided to means for displaying an image of the field of view, the pixels of the displayed image corresponding to the output signals generated by the elements of the array. However, this device is not suitable for use in a crowded environment.

The research of enabling millimeter wave for tracking target imaging stays on active mode and only permits single target screening. The inventors devise that passive millimeter wave imaging device may be used for mass pre-screening for theft/threat detection. For example, a method or device which utilizes passive millimeter wave may be used for scanning multiple on-the-move targets or providing fully automatic theft/threat alert system based on this multi-sensor system.

The system may utilise passive millimeter wave via multi-sensor system to overcome the limitation of passive millimeter wave on crowd pre-screening for theft/threat detection. In one preferred embodiment of the present invention, there is provided a multi-sensor system comprising multiple imaging sensors and a passive millimeter wave imaging device for scanning multiple moving targets within the sensors' field of vision. This can be used in surveillance tracking and theft/threat detection.

In one preferred embodiment of the present invention, the multi-sensor system uses multi-frame analysis technique in which the system analyses multiple consecutive frames in order to eliminate noises caused by moving target so that the target does not need to stand still for scanning.

In another embodiment of the present invention, the multi-sensor system uses multiple sensors with various capabilities to segment and detect any suspicious concealed object of each individual in a crowd.

In this specification, passive millimeter wave sensor or imaging device is a sensor or device adapted to receive millimeter wave directly emitted or radiated from a body or an object instead of receiving millimeter wave reflected from the body or the object. It is different to an active millimeter wave sensor or imaging device which is adapted to receive millimeter wave emitted from an illumination source to a body and reflected back from the body.

A multimodal sensor or multimodal imaging device is a sensor or imaging device for sensing or taking images of electromagnetic waves that are not millimeter wave. In one embodiment, the multimodal sensor or multimodal imaging device is any one of a RGB camera, a depth camera, a thermal camera, or infrared sensor.

In one embodiment of the present invention as shown in FIG. 1, there is provided a crowd surveillance device 10 comprising: a multi-sensor system connected to a processing device 13.

In this embodiment, the multi sensor system should at least consist of one passive millimeter wave imaging device 11, and one or more multimodal sensors 12 such as a RGB camera, a depth camera and a thermal camera as shown in FIG. 1.

The processing device 13 comprising an image fusion module 14, an image analytic module 15, an alert triggering module 16. The processing device 13 is adapted to obtain image signals from a multi-sensor system and processes the images with different software modules. In one embodiment, the multi sensor system is directly wired to the processing device 13 through data cables. In another embodiment, the multi sensor system is remotely connected to the processing device 13 through a wireless protocol such as WiFi or Bluetooth.

Referring to FIG. 1, the image fusion module 14 comprises a hardware or software module which can transform the images and find a mutual alignment by solving the correspondence problem in computer vision.

The image analytic module 15 is a hardware or software module which processes the fused images to perform the following operation: 1) extract each individual from multiple targets, 2) find the suspicious contraband and correlate it to the extracted individuals and 3) differentiate a truly concealed object to enhance the detection capability of the passive millimeter wave The alert triggering module 16 is a hardware or software module that analyses the suspicious target and concealed object identified from image analytic module across multiple frames. By analysing a series of time lapse frames, a more accurate alert can be triggered by this module.

The processing device 13 is associated with a database server 17 for storing and retrieving image data. The database server 17 is connected to an alert visualisation device 18.

Once there is an alert asserted by the processing device 13, the database server 17 will collect and store the detailed information of the suspects from the processing device. The visualization device 18 is adapted to receive or retrieve an alert and its corresponding detailed information from the database and display the information on a display of the visualization device (e.g. screen, tablet . . . ).

In one embodiment of the present invention, there is provided a method of using multi-sensor theft/threat detection for crowd pre-screening, the method comprising the steps of:

transforming images obtained from the multi-sensor system;

fusing transformed images;

extracting each individual target with a depth sensor and a thermal sensor and tracing the target across multiple frames;

analysing a series of time lapse passive millimeter wave image generated by the passive millimeter wave sensor for identifying any conceal object on the individual target;

triggering an alert and storing the images and related information to the database; and displaying an alert, images and the information on a display device.

In one embodiment, the multi-sensor system comprises a passive millimetre wave sensor 11, a RGB imaging device 12, a depth sensor 12, and a thermal sensor 12.

In one embodiment, multi-sensor system is adapted to carry out a calibration process on imaging sensors of multi-sensor system. This is done by having the multi-sensor system first calibrated to obtain the pixel mapping relationship between the images. This is an offline process and only has to be done once prior to system setup.

The images are all transformed based on the pixel mapping relationship. This transformation allows them to align on the same camera plane to ease the image fusion.

In one preferred embodiment, the fusing images step is conducted by feature points matching. In another embodiment, the fusing images step is conducted by solving the disparity with the help of a depth sensor. If there is feature point common to all images, the fusion step can be done by feature point matching If common feature point does not exist, the fusion step can be done by modeling the disparity between cameras and translate the images in real-time based on the depth information.

Figure 2:
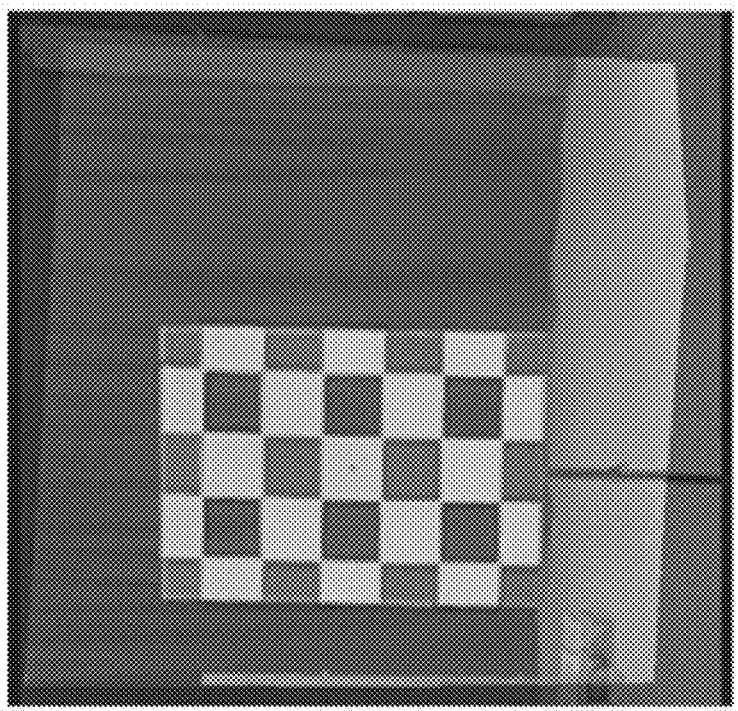
FIG. 2 illustrates two image fusion results obtained with or without transformation.
Figure 2:
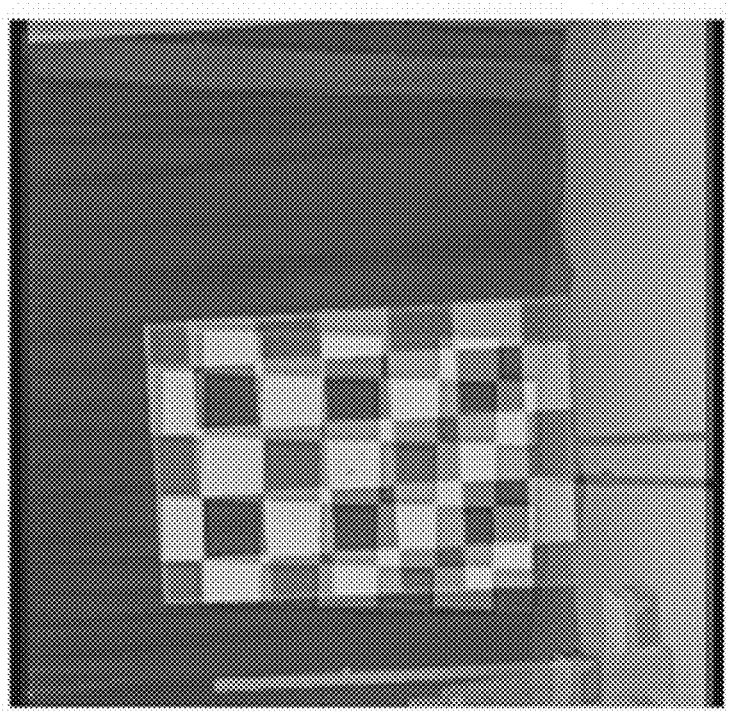

FIG. 2 illustrate the difference between image fusion with or without image transformation. A translation vector, which can be obtained from either feature points matching or modeling the disparity between the imaging sensors, is used to align the transformed images.

In the step of extracting individual target on an image, the processing device 13 is adapted to analyse images from the depth sensor and the thermal sensor. The processing device 13 extracts or identify objects from depth sensor by analyzing an image from the depth sensor in different depth layers.

The fusing module 14 of the processing device then fuses images from the depth sensor and the thermal sensor. By fusing depth and thermal image, the processing devices 13 is adapted to determine if the object extracted from depth sensor is a human (individual target) being. This is based on the assumption that a human body has a constant temperature which is usually distinguishable with other objects.

Having set a bandwidth of the thermal detection region, non-human object can be further filtered out for further processing.

In this specification, a concealed object is an object located and covered by one or more layer of materials without any covering object (e.g. a bag) in front of the material. The material must be one that is penetrable by millimetre wave. In other application, the passive millimetre waver sensor may be replace by X-Ray sensor, such that the material may be a thicker and different kind of material such as plastics or human fresh.

Once the individual targets are identified, the images are pass on to the image analytic module 15 for performing automatic concealed object detection method based on the images from the passive millimeter wave sensor 11.

The extraction method above can segment each individual target. Combining this result with the automatic concealed object detection on passive millimeter wave image, the processing device 13 is able to detect each individual in a crowd one by one.

Figure 3:
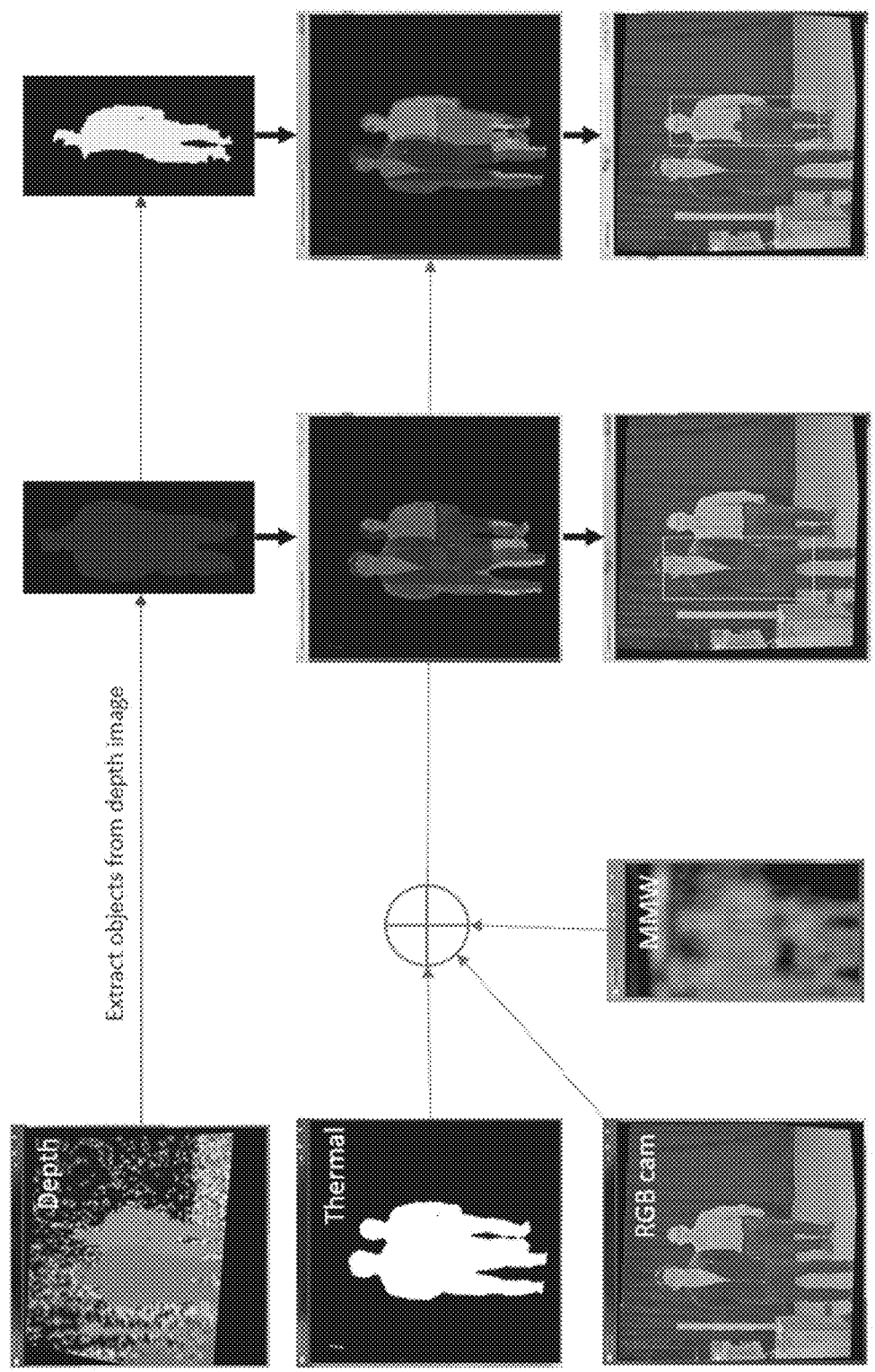
FIG. 3 illustrates an overall image fusion result based on individual images obtained by multiple image sensors, and the results of locating a hidden object concealed by two different identified persons.

FIG. 3 shows the concealed objection detection method of an embodiment of the present invention.

The analytic module 15 is adapted to analyse passive millimeter wave images to indicate a detection of concealed object in two cases: 1) there is only concealed object hidden under clothes and 2) there is a covering object in front of clothes, but the one with a covering object in front of clothes is of less interest. In one embodiment of the present invention to detect the outstanding case where concealed object is hidden under clothes without any covering object in front of clothes.

In one embodiment, the analytic module 15 is adapted to differentiate these two cases by analyzing thermal images and passive millimeter wave images. In the event that a covering object is found in front of clothes, the surface temperature is usually lower than that of the clothes. Hence, the thermal images will show an abrupt change of temperature on the surface of the clothes. In the event that the concealed object is hidden under clothes, the surface temperature is relatively more constantly distributed on the surface of the clothes.

In one preferred embodiment, the analytic module 15 is adapted to differentiate these two events by analyzing the temperature distribution and abruptness of temperature change on the surface of clothes.

In one embodiment, the processing device 13 is adapted to track each individual target and its motion with computer vision algorithm, such as Kalmar filter.

The processing device 13 is adapted to save all the positive alerts in an alert record associated with each tracked individual across a number of consecutive frames. The processing device 13 may store the alert record in its own memory device, such as hard drive, solid state drive, RAM, etc. In other embodiment, the processing device 13 may store the alert records in the database server 17.

In the event a concealed object is found, the processing device 13 is adapted to raise an alert and store the data into a database server 17 when there are at least more than one alert within each alert record found for a particular tracked individual.

In one embodiment, the processing device 13 is associated with an alert visualization device 18. The visualization device 18 is adapted to periodically queries the database server 17 and pops up any new alert and display detailed information of the suspects on the device It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A crowd surveillance device comprising:
   a multi-sensor system connected to a processing device, wherein the processing device comprises
      an image fusion module for receiving images from the multi-sensor system, transforming and fusing images into a fused image;
      an image analytic module for extracting each individual target and identifying any concealed object on the individual target,
      an alert triggering module for triggering an alert in the event a concealed object on the individual target is identified,
      wherein the multi-sensor system comprises a passive millimetre wave sensor, a RGB imaging device, a depth sensor, and a thermal sensor, and
      wherein the image analytic module is adapted to analyse a series of time lapse fused images generated by the image fusion module for tracing the individual target and identifying any concealed object on the individual target.

2. A crowd surveillance device of claim 1, wherein the multi-sensor system is connected to the processing device through a wired connection.

3. A crowd surveillance device of claim 1, wherein the multi-sensor system is connected to the processing device through a wireless connection.

4. A crowd surveillance device of claim 1, wherein the alert triggering module is adapted to storing the alert, the images and related information to a database server connected to the processing device.

5. A crowd surveillance device of claim 4, wherein the processing device is adapted to connect to an alert visualization device displaying an alert, images and the information.

6. A crowd surveillance device of claim 5, wherein the image fusion module comprises a hardware or software module adapted to transform images received and find a mutual alignment by solving the correspondence problem in computer vision.

7. A crowd surveillance device of claim 6, wherein the image analytic module is adapted to process the fused image by carrying out the step of:
   extracting each individual from multiple targets on the fused image,
   finding any suspicious contraband from the passive millimeter wave sensor and thermal sensor and correlate it to the extracted individual and
   differentiating a truly concealed object by comparing images generated from the passive millimeter wave sensor and thermal sensor.

8. A crowd surveillance device of claim 7, wherein the alert triggering module is adapted to analyse the suspicious target and concealed object identified from image analytic module across multiple frames.

9. A crowd surveillance device of claim 8, wherein the processing device is associated with a database server for storing and retrieving image data.

10. A crowd surveillance device of claim 9, wherein the database server is connected to an alert visualisation device.

11. A crowd surveillance device of claim 10, wherein the database server is adapted to collect and store information of suspects once there is an alert asserted by the processing device.

12. A crowd surveillance device of claim 11, wherein the visualization device is adapted to receive or retrieve an alert and its corresponding information from the database.

13. A crowd surveillance device of claim 12, wherein the visualization device comprises a display for displaying the information.

14. A method of using multi-sensor theft/threat detection for crowd pre-screening, the method comprising the steps of:
   transforming images obtained from the multi-sensor system;
   fusing transformed images;
   extracting each individual target with a depth sensor and a thermal sensor and trace the target across multiple frames;
   analysing a passive millimeter wave image of each extracted individual target on the image across multiple frame and identifying any concealed object on the individual target,
   wherein the multi-sensor system comprises a passive millimetre wave sensor, a RGB imaging device, a depth sensor, and a thermal sensor, and
   wherein the extracting step comprises a step of analysing a series of time lapse fused images generated in the fusing step for tracing the individual target and identifying any concealed object on the individual target.

15. A method of claim 14, further comprising the step of triggering an alert and storing the images and related information to the database.

16. A method of claim 15, further comprising the step of displaying an alert, images and the information on a display device.

17. A method of claim 14, wherein the multi-sensor system is connected to the processing device through a wired connection.

18. A method of claim 14, wherein the multi-sensor system is connected to the processing device through a wireless connection.

19. A method of claim 14, further comprising the step of storing the alert, the images and related information to a database server.

20. A method of claim 19, further comprising the step of connecting to an alert visualization device for displaying an alert, images and the information.

21. A method of claim 20, wherein the transforming image step comprises the step of transforming images received from the multi-sensor system and finding a mutual alignment by solving the corresponding problem in computer vision.

22. A method of claim 21, wherein the analysing step further comprises the step of:
   extracting each individual from multiple targets on the fused image,
   finding any suspicious contraband from the passive millimeter wave sensor and thermal sensor and correlate it to the extracted individual and
   differentiating a truly concealed object by comparing images generated from the passive millimeter wave sensor and thermal sensor.

23. A method of claim 22, further comprising the step of analysing the suspicious target and concealed object identified from image analytic module across multiple frames.

24. A method of claim 23, further comprising the step of confirming suspicious contraband of an individual and generate alert through accumulating the positive detection result from image analytic module across multiple time lapse frames.

25. A method of claim 24, wherein the database server is adapted to storing and retrieving image data, and associate with a processing device connected to the multi-sensor system.

26. A method of claim 25, wherein the database server is connected to an alert visualisation device.

27. A method of claim 26, wherein the database server is adapted to collect and store information of suspects once there is an alert asserted by the processing device.

28. A method of claim 27, wherein the visualization device is adapted to receive or retrieve an alert and its corresponding information from the database.

29. A method of claim 28, wherein the visualization device comprises a display for displaying the information.

* * * * *